(12) United States Patent
Hyun

(10) Patent No.: US 10,080,356 B2
(45) Date of Patent: Sep. 25, 2018

(54) BAIT CASTING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 15/613,699

(22) Filed: Jun. 5, 2017

(65) Prior Publication Data

US 2017/0354133 A1    Dec. 14, 2017

(30) Foreign Application Priority Data

Jun. 8, 2016 (KR) .................. 10-2016-0070883

(51) Int. Cl.
| | | |
|---|---|---|
| A01K 89/01 | (2006.01) | |
| A01K 89/0155 | (2006.01) | |
| A01K 89/015 | (2006.01) | |

(52) U.S. Cl.
CPC .... *A01K 89/01555* (2013.01); *A01K 89/0192* (2015.05)

(58) Field of Classification Search
CPC .................. A01K 89/015; A01K 89/01555
See application file for complete search history.

(56) References Cited

U.S. PATENT DOCUMENTS

| | | | | |
|---|---|---|---|---|
| 4,601,439 A | * | 7/1986 | Moosberg | A01K 89/01555 242/288 |
| 4,830,308 A | * | 5/1989 | Puryear | A01K 89/01555 242/288 |
| 9,854,791 B2 | * | 1/2018 | Toake | A01K 89/045 |
| 2009/0026300 A1 | * | 1/2009 | Tsutsumi | A01K 89/01555 242/288 |
| 2013/0306777 A1 | * | 11/2013 | Ikebukuro | A01K 89/01555 242/288 |
| 2016/0037759 A1 | * | 2/2016 | Ikebukuro | A01K 89/01555 242/288 |

FOREIGN PATENT DOCUMENTS

KR    100949369    3/2010

* cited by examiner

*Primary Examiner* — Emmanuel Monsayac Marcelo
(74) *Attorney, Agent, or Firm* — Cantor Colburn LLP

(57) ABSTRACT

Provided is a bait casting reel including braking magnets that provide braking force against rotation of a spool using magnetic force to prevent backlash of the spool in casting. The bait casting reel allows a user to minimally space a spool and an anti-backlash unit to set the maximum braking force of a braking magnet by bringing the spool and the anti-backlasher in contact with each other when a braking dial for moving the anti-backlasher left and right in the longitudinal direction of the spool is turned to the maximum, in order to prevent the braking magnet from being worn or damaged by coming in contact with the spool due to deformation of the rotary shaft of the spool or a friction washer and to allow the user to freely and easily adjust the braking force of the braking magnet without replacing a part.

4 Claims, 23 Drawing Sheets

BAIT CASTING REEL

BACKGROUND OF THE INVENTION

Field of the Invention

The present invention relates to a bait casting reel having a braking magnet that provides torque to a spool using a magnetic force to prevent backlash of the spool in casting. More particularly, the present invention relates to a bait casting reel that allows a user to minimally space a spool and an anti-backlash unit to set the maximum braking force of a braking magnet by bringing the spool and the anti-backlash unit in contact with each other when a braking dial for moving the anti-backlash unit left and right in the longitudinal direction of the spool is turned to the maximum, in order to prevent the braking magnet from being worn or damaged by coming in contact with the spool due to deformation of the rotary shaft of the spool or a friction washer and to allow the user to freely and easily adjust the braking force of the braking magnet without replacing a part.

Description of the Related Art

In general, in casting with a bait casting reel for fishing, the rotational speed of the spool that unwinds a fishing line is higher than the flying speed of a lure, so the carry distance of the lure is reduced or the fishing line is entangled. These phenomena are called backlash.

In order to prevent such backlash, bait casting reels are equipped with a friction brake that uses physical friction and a magnetic brake that uses magnetic attraction.

The friction brake has the maximum torque at the early stage of casting, generates friction using a brake shoe and a brake pad, which are brought in contact with each other by centrifugal force, and reduces the rotational speed of a spool and also decreases its braking force, as the torque is gradually decreased by the friction. Accordingly, the friction brake is advantageous in terms of long-distance casting, as compared with the magnetic brake, but it has difficulty in fine adjustment of the braking force. Further, it is easily worn and makes large noise due to the friction between the brake shoe and the brake pad.

In order to solve this problem, a magnetic brake has been disclosed in Korean Patent No. 10-0949369. The magnetic brake, which is a non-contact type brake, unlike a friction brake, reduces the rotational speed of a spool by applying magnetic attraction to a rotating spool using the magnetism of a plurality of braking magnets on the reel body.

Most bait casting reels equipped with the magnetic brake allow users to adjust the braking force by freely adjusting the gap between the braking magnets and the spool.

That is, when the braking magnets are moved maximally close to the spool, the magnetic force applied to the spool increases and the braking force becomes the maximum. Further, when the braking magnets are maximally spaced away from the braking magnets, the magnetic force applied to the spool decreases, so the braking force becomes the minimum.

A part called a braking dial is mounted on the reel body to adjust the gap between the braking magnets and the spool.

According to this configuration, it is required to move the braking magnets maximally close to the spool without bringing the braking magnets in contact with the spool in order to set the braking force of the braking magnets to the maximum.

However, when the parts of the bait casing reel are deformed, the braking magnets and the spool are brought in contact with each other, so the parts are easily worn and damaged. Accordingly, many bait casing reels on the market are manufactured with the gap between the braking magnets and the spool set smaller than the actual distance where the braking magnets act the maximum braking force in order to reduce breakdowns.

In other words, a spool or the shaft of the spool may be deformed by tension of a fishing line when the fishing line is wound around the spool, or when load is applied to a rotating spool in a casing by a spool lock, which is an assistant part for preventing backlash, a friction washer supporting the shaft of the spool may be deformed. In these cases, the braking magnets and the spool may come in contact with each other with the gap between them reduced.

Accordingly, bait casting reels have been manufactured with a large gap between braking magnets and a spool in the related art in consideration of such deformation of parts.

Therefore, nevertheless of the advantages of a magnetic brake, it is difficult to obtain the maximum braking force by maximally moving braking magnets close to a spool and the reduction of braking force increases the number of braking magnets or requires another assistant part for obtaining appropriate braking of a spool, thereby complicating the structure of a bait casting reel.

Further, since existing bait casting reels on the market are manufactured with a predetermined gap between braking magnets and a spool, a user cannot freely adjust the maximum braking force of the braking magnet and cannot adjust the braking force into an optimum braking force to fit to the state of a bait casting reel.

SUMMARY OF THE INVENTION

The present invention has been made in an effort to solve the problems and an object of the present invention is to provide a bait casting reel including barking magnets for a user to be able to adjust the maximum braking force of the braking magnets, depending on deformation and wear of parts of the reel. The bait casting reel includes: a spool rotatably coupled to a reel body through a shaft to wind a fishing line thereon; an anti-backlash unit having braking magnets disposed inside of a spool cover of the reel body to provide braking force for reducing a rotational speed of the spool using magnetic force applied to the spool from the braking magnets; and a braking dial exposed to the outside through the spool cover of the reel body to be rotated in two directions in order to adjust the braking force of the braking magnet by moving the anti-backlash unit left and right in an axial direction of the spool to adjust a gap between the braking magnets and the spool when being rotated in the two directions, when the spool and the braking magnets come in contact with each other when the braking dial is rotated to a maximum, so a user can adjust the gap between the spool and the backlash unit to be minimum to set maximum braking force of the braking magnets.

Another object of the present invention is to provide a bait casting reel that allows a user to set the maximum braking force in person to fit to the current state of the reel without additionally setting specific parts or replacing parts, to appropriately maintain and change the optimum braking force of braking magnets for the current use state, to easily and quickly set the braking force, and to change a difference of the braking force that is generated in use by calibrating the reel.

In order to achieve the objects of the present invention, a bait casting reel of the preset invention includes: a spool rotatably coupled to a reel body through a shaft to wind a fishing line thereon; an anti-backlash unit having braking magnets disposed inside of a spool cover of the reel body to provide braking force for reducing a rotational speed of the spool using magnetic force applied to the spool from the braking magnets; and a braking dial exposed to the outside through the spool cover of the reel body to be rotated in two directions in order to adjust the braking force of the braking magnet by moving the anti-backlash unit left and right in an axial direction of the spool to adjust a gap between the braking magnets and the spool when being rotated in the two directions, in which when the spool and the braking magnets come in contact with each other when the braking dial is rotated to a maximum, so a user can adjust the gap between the spool and the backlash unit to be minimum to set maximum braking force of the braking magnets.

The spool and the anti-backlash unit may come in contact with each other when the braking dial is rotated to the maximum, by moving the anti-backlash unit toward the spool such that the braking magnets come in contact with an outer side of the spool when the braking dial is rotated to the maximum.

The spool may include a braking pad on an outer side thereof, and contact of the spool and the anti-backlash unit when the braking dial is rotated to the maximum may be made in a way of making the braking pad be movable toward the anti-backlash unit in the axial direction of the spool and bringing the braking pad in contact with the braking magnets, or may be made in a way of making the braking pad be replaceable from the outside of the spool and bringing a new braking pad in contact with the braking magnets.

The anti-backlash unit may have magnet holders for fixing the braking magnets to the movable member, the magnet holders may protrude toward the spool further than inner sides of the braking magnets, and the spool and the anti-backlash unit may come in contact with each other when the braking dial is rotated to the maximum, by moving the anti-backlash unit toward the spool such that the magnet holders come in contact with an outer side of the spool when the braking dial is rotated to the maximum.

According to the bait casting reel of the present invention, the spool and the anti-backlash unit come in contact with each other when the braking dial is rotated to the maximum, so a user can adjust the gap between the spool and the anti-backlash unit to be minimum to set the maximum braking force of the braking magnets and can maintain and use the maximum braking force of the braking magnets. In particular, when the braking force changes due to wear or deformation of parts of the reel in use, a user can easily calibrate the reel, so the user can manage and maintain the bait casting reel in the optimum state and set the optimum braking force in accordance with the state of the reel or his/her preference.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
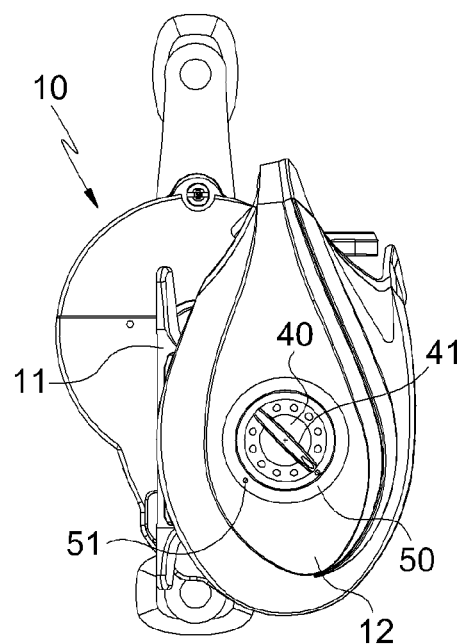
FIGS. 1A to 3B are side views and cross-sectional views showing a first embodiment of the present invention.
Figure 1B:
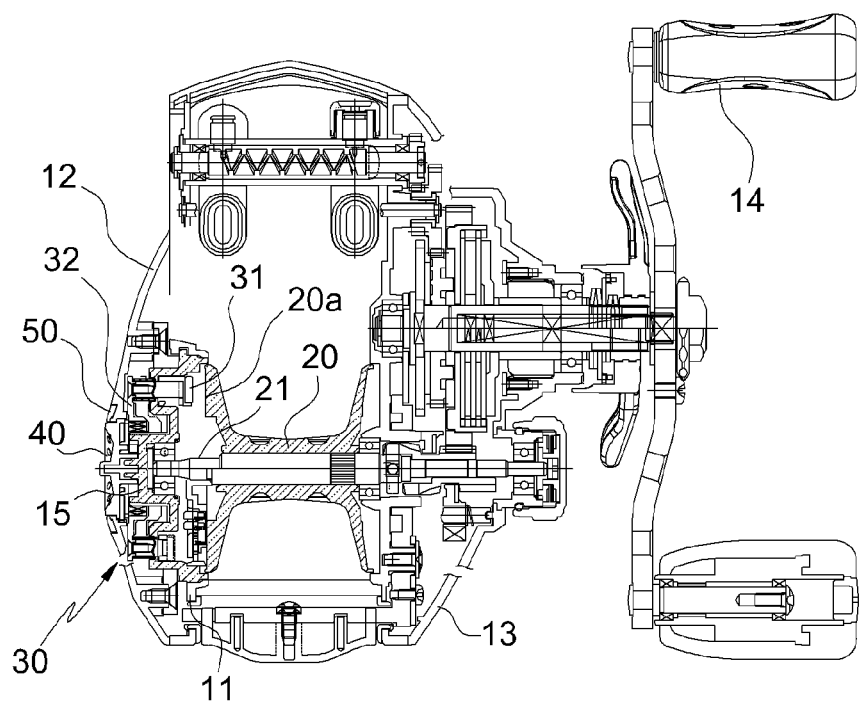
Figure 2A:
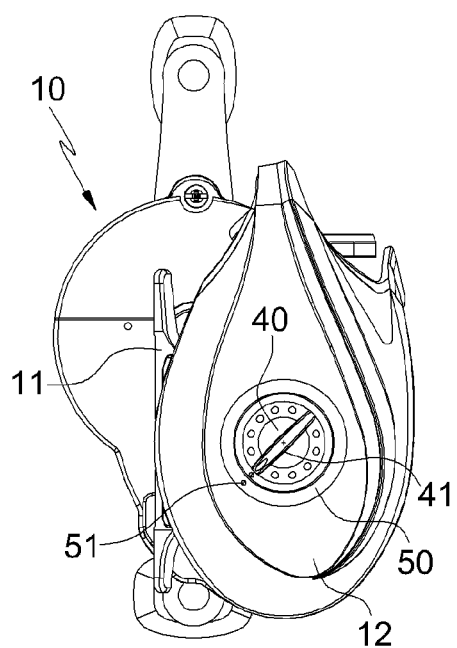
Figure 2B:
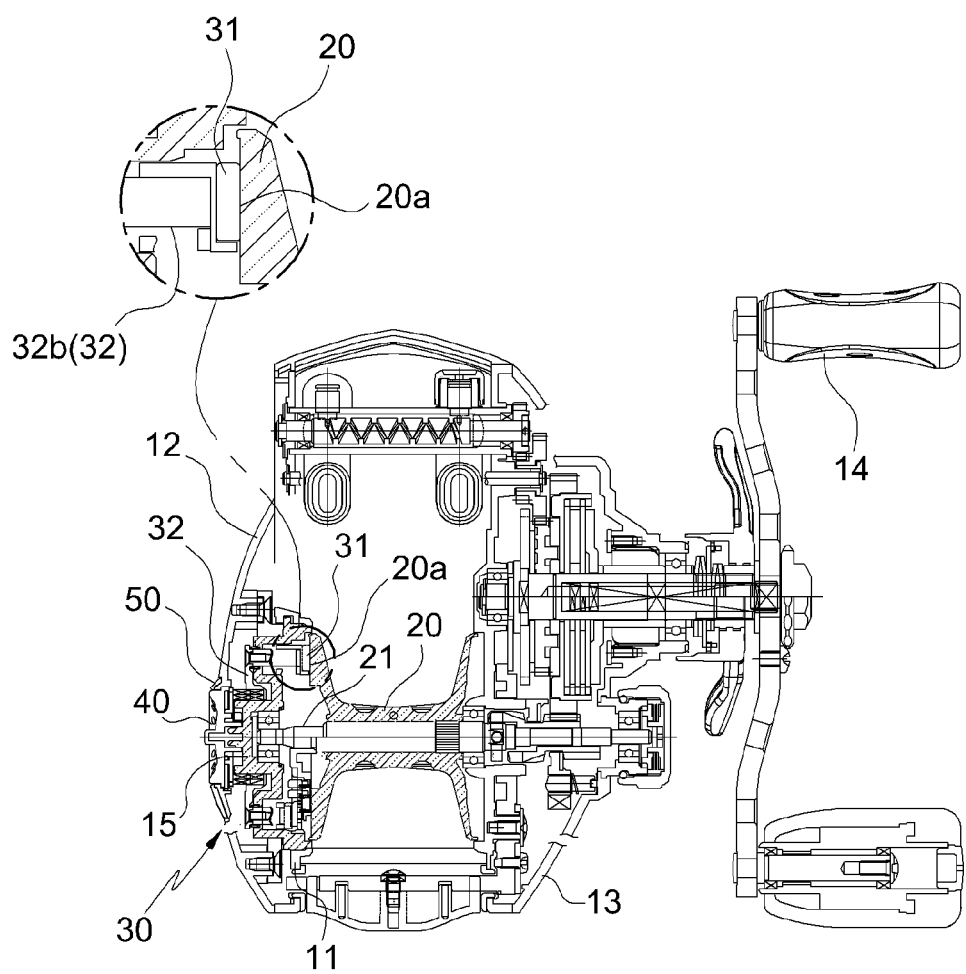
Figure 3A:
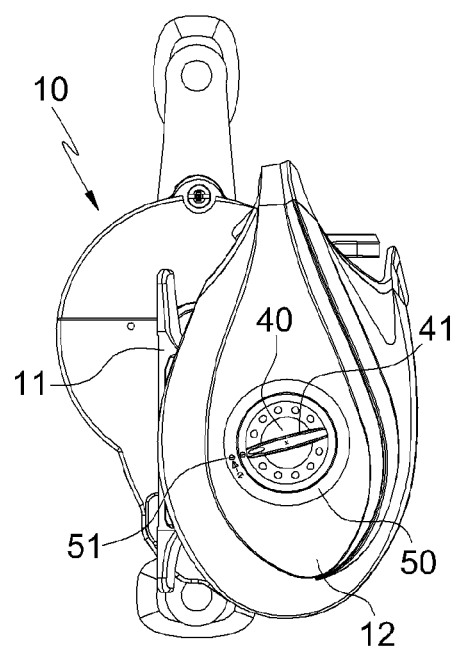
Figure 3B:
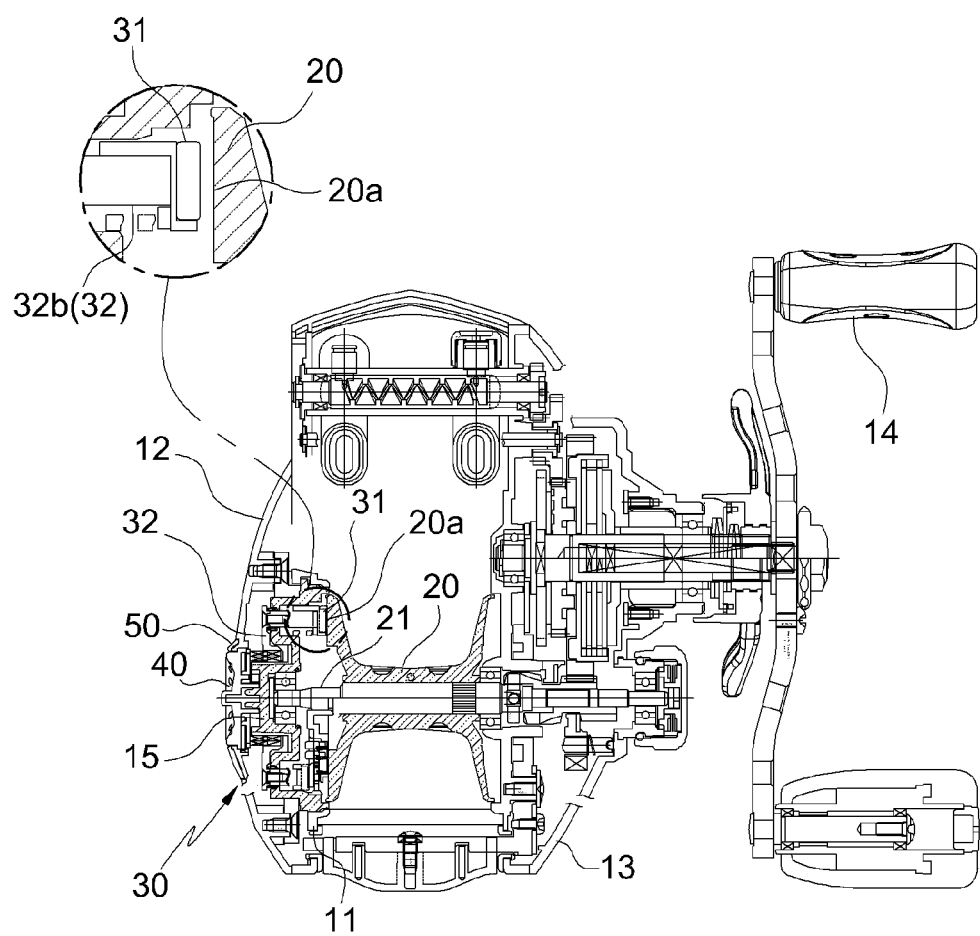
Figure 4:
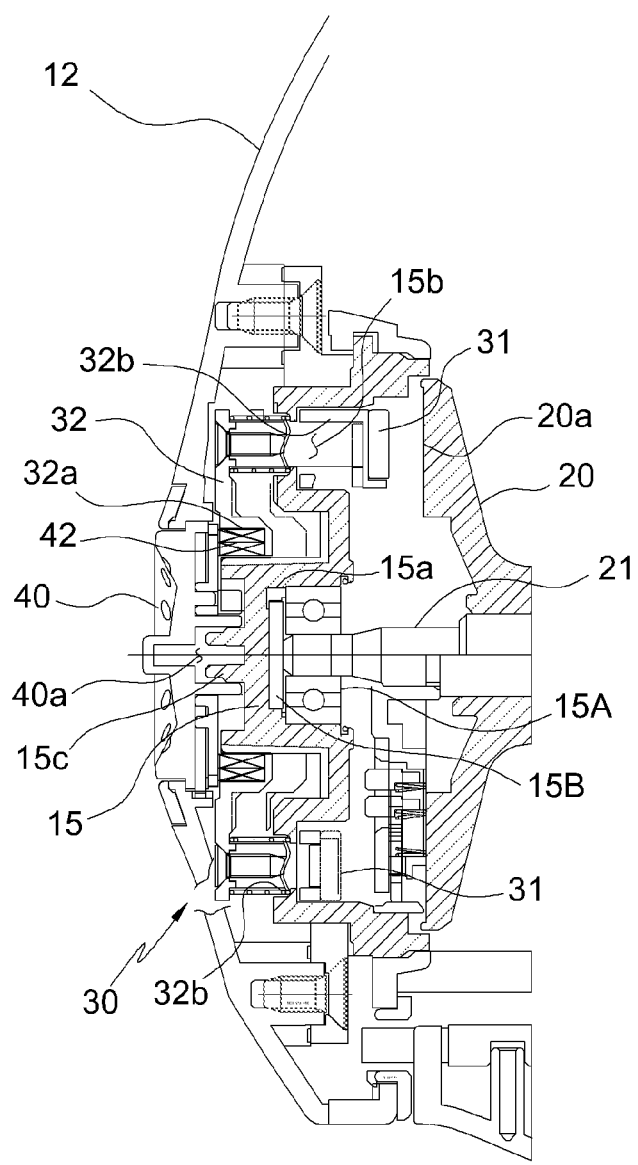
FIG. 4 is an enlarged cross-sectional view showing main parts of the first embodiment of the present invention.
Figure 5A:
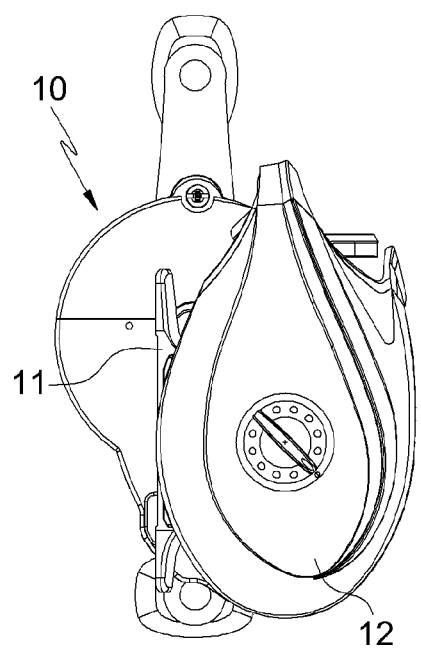
FIGS. 5A to 7B are side views and cross-sectional views showing a second embodiment of the present invention.
Figure 5B:
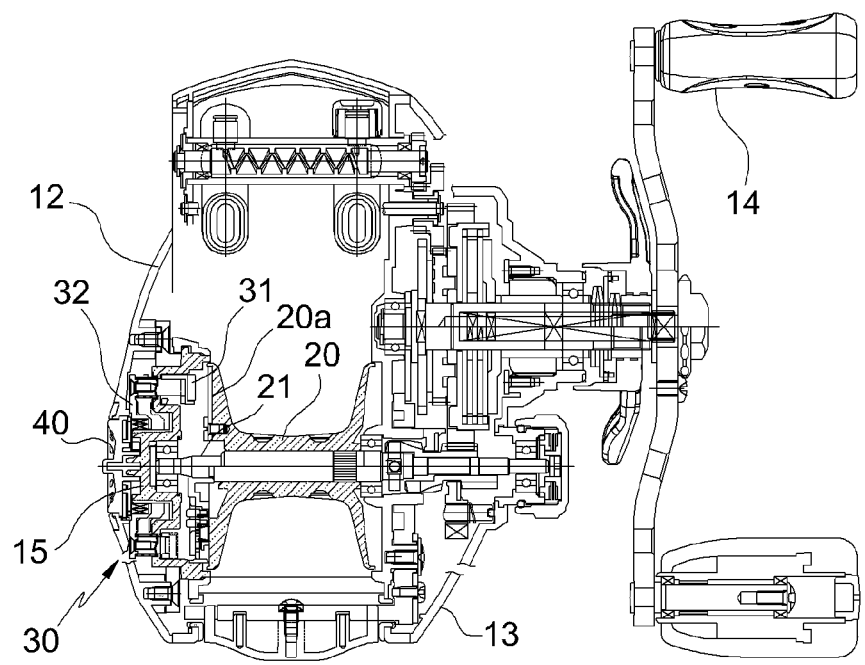
Figure 6A:
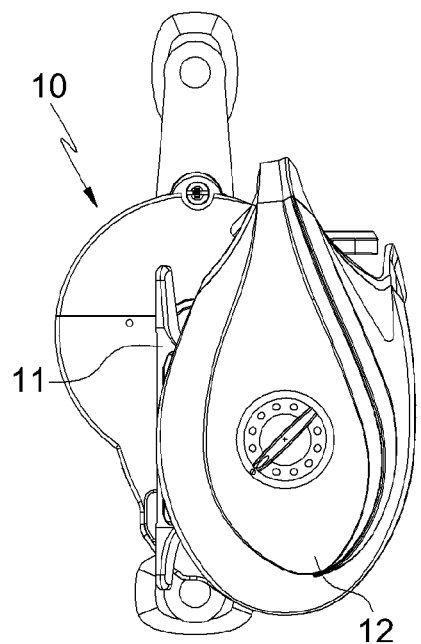
Figure 6B:
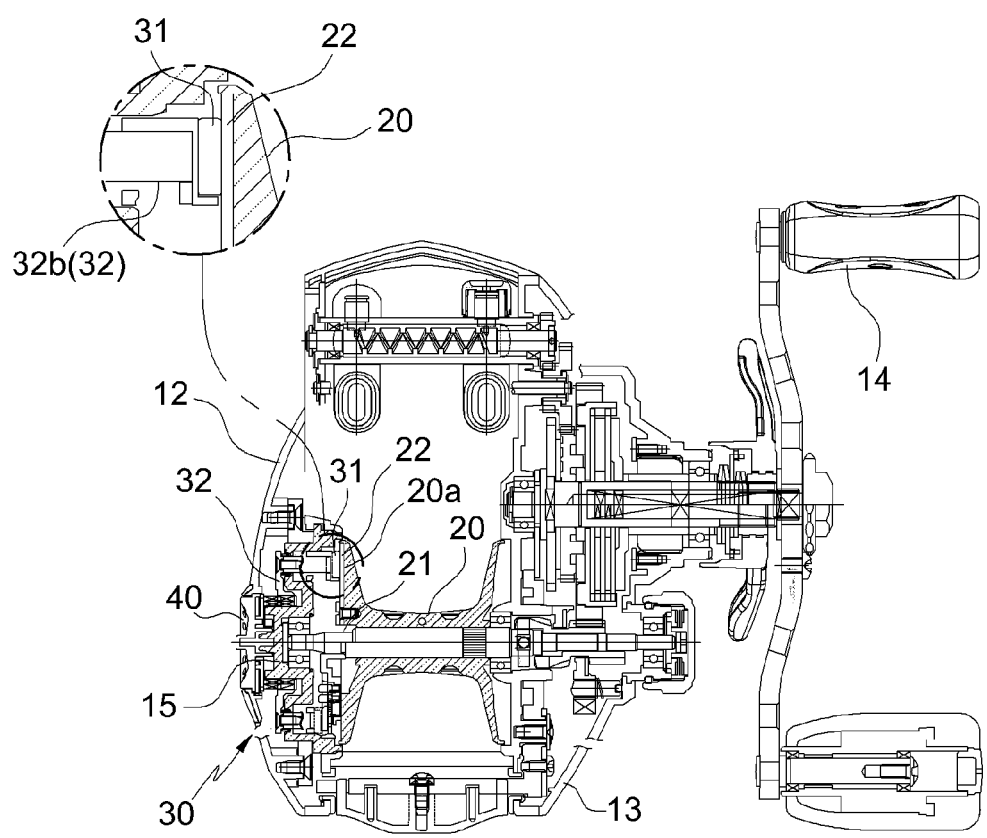
Figure 7A:
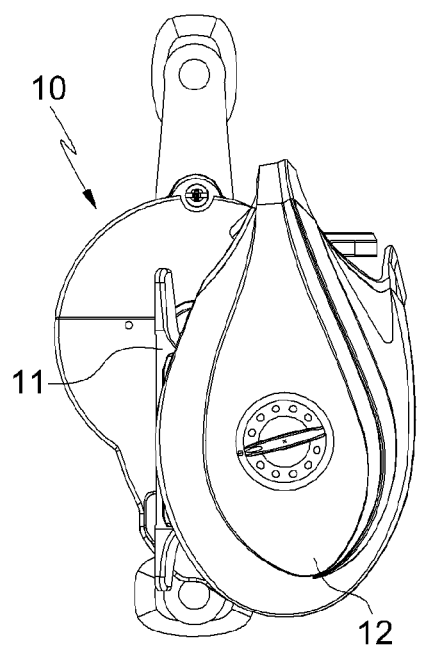
Figure 7B:
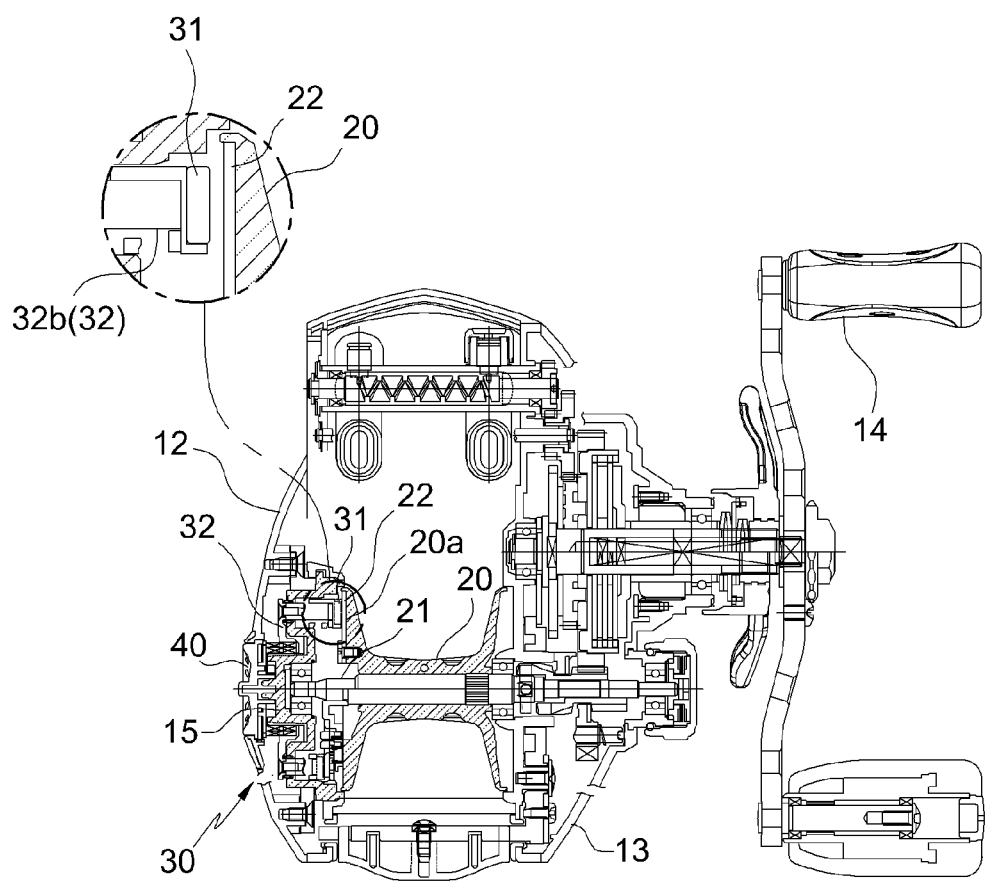
Figure 8:
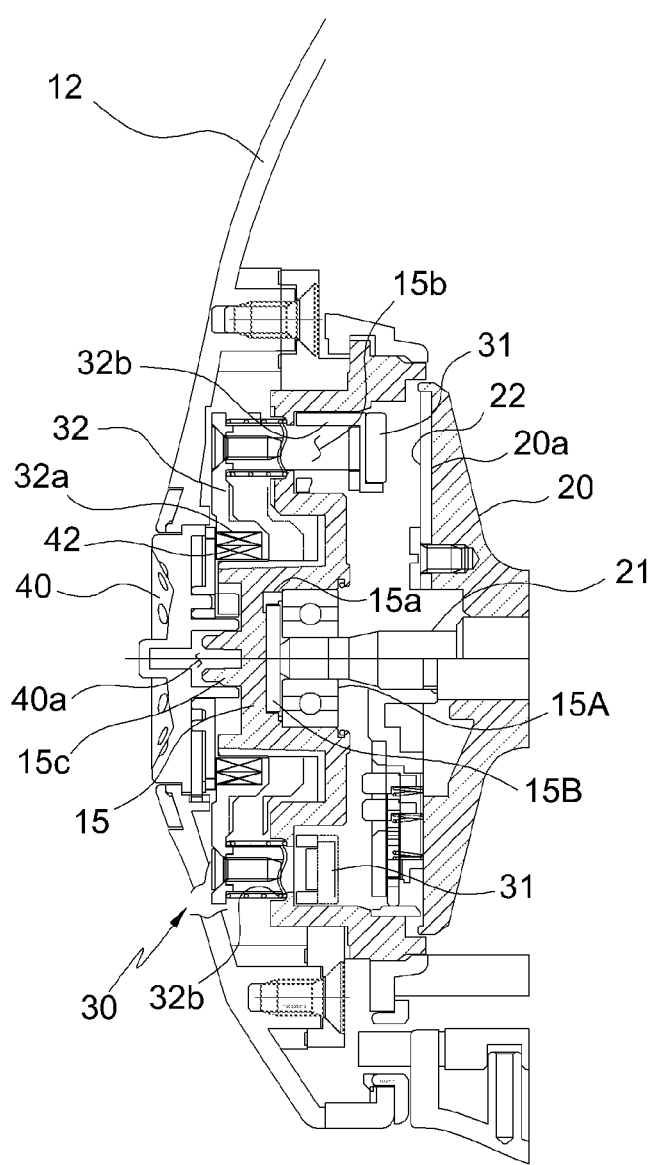
FIG. 8 is an enlarged cross-sectional view showing main parts of the second embodiment of the present invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminologies used herein are for the purpose of describing particular aspects (or embodiments) only and are not intended to be limiting of the present invention. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive element, but constitutive element should not be limited to a manufacturing order, and the terms described in the detailed description of the invention may not be consistent with those described in the claims A bait casting reel according to the present invention is described hereafter with reference to the accompanying drawings.

The present invention relates to a bait casting reel having a braking magnet that is provided for preventing backlash of a fishing line in casting and can be calibrated.

FIGS. 1A to 12 shows side views and cross-sectional views of embodiments of the present invention.

As shown in the figures, a bait casting reel includes a reel body 10 coupled to a fishing rod, a spool 20 for winding a fishing line thereon, an anti-backlash unit 30 having braking magnets 31 that provide braking force for reducing the rotational speed of the spool 20, and a braking dial 40 for adjusting the braking force of the braking magnets 31.

In the reel body 10, side covers 12 and 13 are coupled to both sides of a body frame 11, respectively, in which the first side cover 12 is detachably coupled to a hole at a side of the body frame 11 so that the spool 20 can be separated or replaced.

The anti-backlash unit 30 having the braking magnets 31 and the braking dial 40 for moving the anti-backlash unit 30 left and right in the axial direction of the spool 20 are disposed at the first side cover 12, and a handle 14 for rotating the spool 20 is disposed at the second side cover 13.

In particular, a spool cover 15 having a shaft hole 15a at the center is fixed to the inner side of the first side cover 12, so the first side cover 12 and the spool cover 15 are detachably coupled together to the body frame 11.

A movable member 32 of the anti-backlash unit 30 is disposed between the first side cover 12 and the spool cover 15, so the movable cover 32 moves left and right in the axial direction of the spool 20 when the braking dial 40 is rotated in two directions.

A bearing 15A that reduces rotational friction of a shaft 21 is disposed in the shaft hole 15A of the spool cover 15, and particularly, a friction washer 15B supporting the end of the shaft 21 is disposed in the shaft hole 15a for easy rotation of the shaft 21.

A reference numeral '15b' not described above indicates holes formed through the spool cover 15 and supports 32b to which the braking magnets 31 are attached are inserted in the holes 15b.

Accordingly, the braking magnets 31 are exposed toward an outer side 20a of the spool 20.

Further, though not shown in the figures, a line releaser (a so-called level winder) is disposed at the front of the reel body 10, a manual brake (a so-called thumb bar or clutch bar) is disposed at the rear of the real body 10, and the bait casting reel includes other components of existing bait casting reels.

The spool 20 is rotatably coupled to the reel body 10 through the shaft 21 to wind a fishing line thereon and both ends of the shafts 21 supposed to rotate with the handles 14 are inserted in shaft holes of both covers of the reel body 10.

The spool 20 can freely rotate when a fishing line is released for casting and a user can move a lure by winding or releasing the fishing line by rotating the handle 14 after casting.

Since the anti-backlash unit 30 has the braking magnets 31 inside the reel body 10 (in detail, in side the first side cover 12), braking force for reducing the rotational speed of the spool 20 is provided by the magnetic force that is applied to the spool 20 from the braking magnets 31.

The anti-backlash unit 30 includes an interlock 32a at the center on the outer side for adjusting a position, the movable member 32 having the supports 32b protruding from the inner side, and the braking magnets 31 at the inner ends of the supports 32b.

The movable member 32 is disposed between the first side cover 12 and the spool cover 15 with an adjuster 42 of the braking dial 40 coupled to the interlock 32a and the supports 32b disposed through the holes 15b.

The magnetic force of the braking magnets 31 on the supports 32b is applied to the outer side of the spool 20 and is used to reduce the rotational speed.

Although supports 32b having different lengths are formed at the front and rear ends of the movable member 32 and the braking magnets 31 are attached to the supports 32b in the figures, the numbers and arrangement of the supports 32b and the braking magnets 31 may be changed.

The anti-backlash unit 30 provides the maximum braking force when the braking magnets 31 are closest to the outer side of the spool 20, and provides the minimum braking force when the braking magnets 31 are farthest away from the outer side of the spool 20.

The braking dial 40, which is provided to adjust the braking force of the braking magnets 31 by adjusting the distance between the braking magnets 31 and the spool 20 by moving the anti-backlash unit 30 left and right in the axial direction of the spool 20, is inserted in the hole of the first side cover 12 to be rotated in two directions outside the reel body 10.

The braking dial 40 has a shaft portion 40a at the center on the inner side and the shaft portion 40a is inserted in a shaft projection 15c on the outer side of the spool cover 15 for coupling the braking dial 40.

The adjuster 42 coupled to the interlock 32a is disposed around the shaft portion 40a.

Accordingly, when the braking dial 40 is rotated in two directions, the movable member 32 of the anti-backlash unit 30 moves straight left and right in the axial direction of the spool 20 so that the gap between the braking magnets 31 and the spool 20 is adjusted.

The interlock structure of the interlock 32a and the adjuster 42 for converting rotation of the braking dial 40 into left and right straight motions of the anti-backlash unit 30 may be achieved in various ways.

For example, threads may be formed around the inner side of the interlock 32a and the outer side of the adjuster 42 so that when the braking dial 40 is rotated, the movable member 32 moves left or right.

According to the present invention, the bait casting reel having the configuration is characterized in that the spool 20 and the anti-backlash unit 30 are configured to come in contact with each other when the braking dial 40 is rotated to the maximum, so a user can calibrate the bait casting reel such that the gap between the spool 20 and the anti-backlash unit 30 becomes the minimum for the maximum braking force of the braking magnets 31, in order to prevent the braking magnets 31 and the spool 20 from being worn or damaged when in contact with each other due to a reduction of the gap between the braking magnets 31 and the spool 20, particularly, the minimum gap between the braking magnets 31 and the spool 20 when the maximum braking force is applied, due to axial deformation of the shaft 21 or wear of the friction washer 15B when the bait casting reel is used.

That is, existing bait casting reels are manufactured with the gap between braking magnets and a spool 20 unconditionally set over a predetermined size in consideration of wear and deformation of their parts, but the bait casting reel of the present invention is manufactured with the braking magnets 31 and the spools 20 in contact with each other for a user to be able to directly adjust the maximum position of the braking magnets 31 for the maximum braking force of the braking magnets 31.

Further, according to the present invention, a user can bring the braking magnets 31 and the spool 20 in contact with each other and then again set the gap, when the braking magnets 31 are not normally operated for the maximum braking force due to wear or deformation of the parts.

Accordingly, a user can manage and keep the function of the anti-backlash unit 30 in the optimum state by adjusting the braking force to fit to changes in state of the reel without adding specific parts or replacing the existing parts.

Therefore, even if the state of the reel changes, a user can change the position of the braking magnets 31 for the maximum braking force and then keep using the reel, so the user can freely use the reel in accordance with his/her preference over the fixed maximum braking force type reels made by manufacturers in the related art.

Detailed embodiments using the structure described above of the present invention are described hereafter.

FIGS. 1A to 4 show a first embodiment of the present invention.

In the first embodiment, when the braking dial 40 is rotated to the maximum, the spool 20 and the anti-backlash unit 30 are brought in contact with each other, in which the anti-backlash unit 30 is moved toward the spool 20 by the rotation of the braking dial 40 to the maximum, so the braking magnets 31 are brought in contact with the outer side of the spool 20.

Accordingly, a user, after purchasing the product, can bring the braking magnets 31 and the spool 20 in contact with each other by rotating the braking dial 40 to the maximum, finely rotating again the braking dial 40 step by step to separate the braking magnets 31 and the spool 20, and then set the optimum position for the maximum braking force through repeated casting exercises.

Further, when the maximum braking force is not normally obtained in use, the user can set the position for the maximum braking force by again calibrating the reel after bringing the braking magnets 31 in contact with the spool 20.

FIGS. 5A to 8 show a second embodiment of the present invention.

In the second embodiment of the present invention, the spool 20 includes a braking pad 22 on the outer side 20a.

Contact of the spool 20 and the anti-backlash unit 30 when the braking dial 40 is rotated to the maximum may be achieved in a way of making the braking pad 22 be movable toward the anti-backlash unit 30 in the axial direction of the spool 20 and bringing the braking pad 22 in contact with the braking magnets 31.

Alternatively, the contact may be achieved in a way of making the braking pad 22 be replaceable from the outside of the spool 20 and bringing a new braking pad 22 in contact with the braking magnets 31.

That is, according to the second embodiment, the reel is calibrated not by bringing the anti-backlash unit 30 in contact with the spool 20, as in the first embodiment, but adjusting the position of the braking pad 22 on the outer side of the spool 20 or replacing the braking pad 22 with a new one.

Accordingly, a user, after purchasing the product, can rotate the braking dial 40 to the maximum, bring the braking pad 22 in contact with the braking magnets 31 or attach a braking pad 22 having an appropriate thickness to the spool 20, finely rotating again the braking dial 40 step by step to separate the braking magnets 31 and the spool 20, and then set the optimum position for the maximum braking force through repeated casting exercises.

Further, when the maximum braking force is not normally obtained in use, the user can set the position for the maximum braking force by again calibrating the reel after bringing the braking pad 22 in contact with the braking magnets 31 or replacing the braking pad 22 with new one having a different thickness.

FIGS. 9A to 12 show a third embodiment of the present invention.

In the third embodiment, the anti-backlash unit 30 further has magnet holders 33 for fixing the braking magnets 31 to the movable member 32.

The magnet holders 33 protrude toward the spool 20 further than the braking magnets 31.

When the braking dial 40 is rotated to the maximum, the spool 20 and the anti-backlash unit 30 are brought in contact with each other, in which the anti-backlash unit 30 is moved toward the spool 20 by the rotation of the braking dial 40 to the maximum, so the magnet holders 33 are brought in contact with the outer side 20a of the spool 20.

That is, the third embodiment is the same, as compared with the first embodiment, in that the anti-backlash unit is moved to come in contact with the spool 20, but different in that not the braking magnets 31 themselves, but the holders 33 that holds the braking magnets 31 come in contact with the spool 20.

According to the third embodiment, since the maximum braking force is based on the gap between the braking magnets 31 and the spool 20 determined by the holders 33 and the holders 33 come in point contact with the outer side 20a of the spool 20, the braking magnets 31 cannot come in direct contact with the spool, so rotational resistance and noise due to friction can be minimized.

Figure 9A:
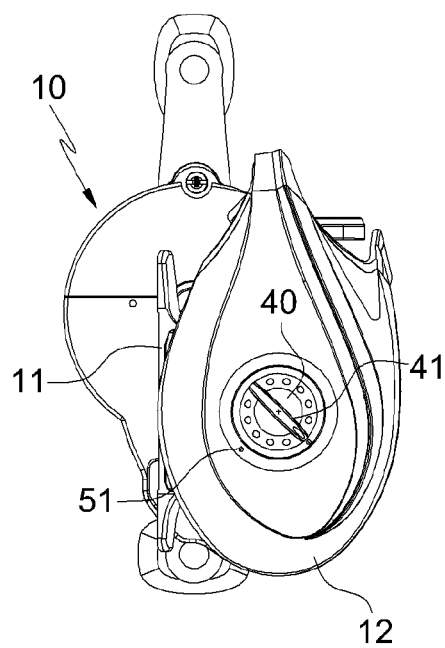
FIGS. 9A to 11B are side views and cross-sectional views showing a third embodiment of the present invention.
Figure 9B:
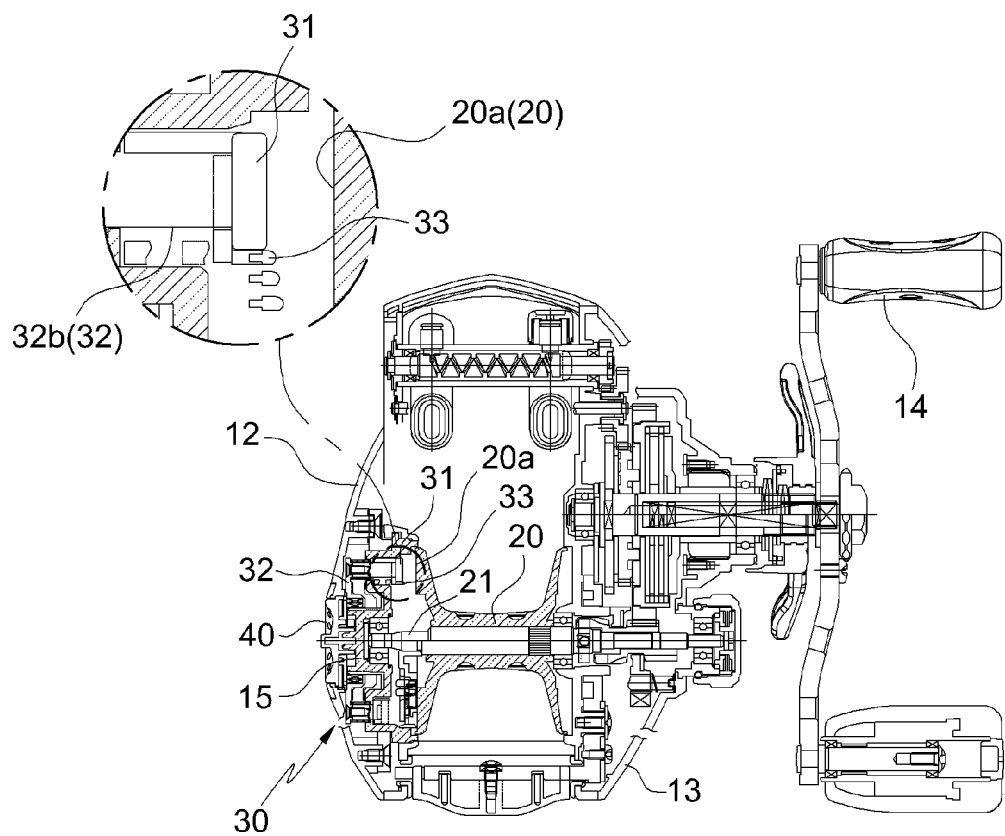
Figure 10A:
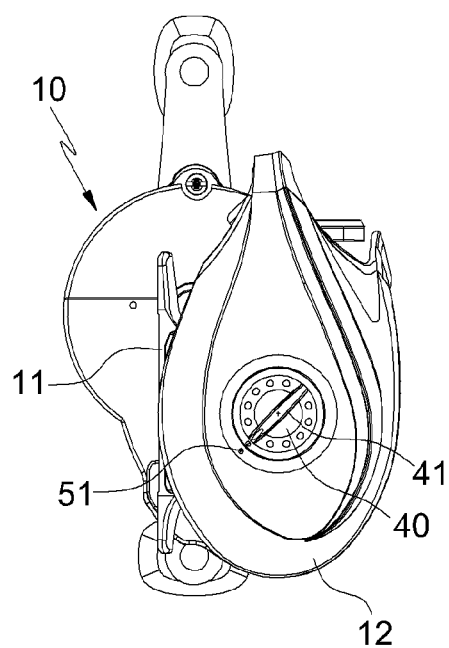
Figure 10B:
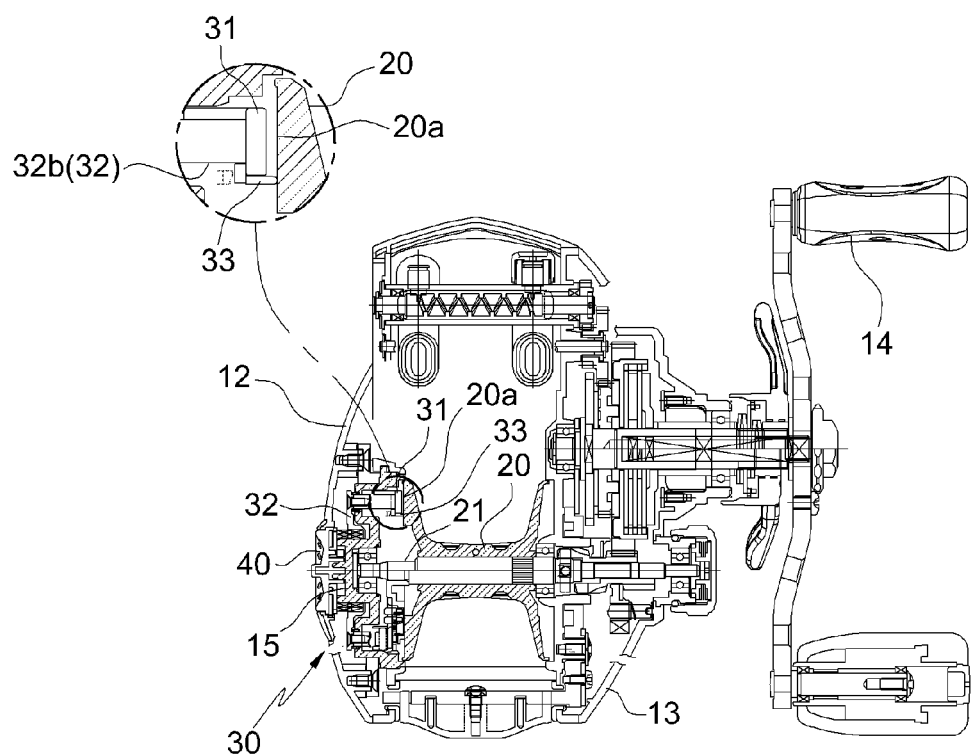
Figure 11A:
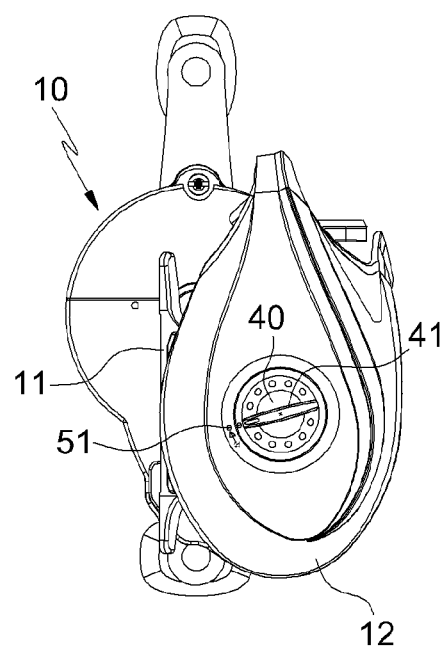
Figure 11B:
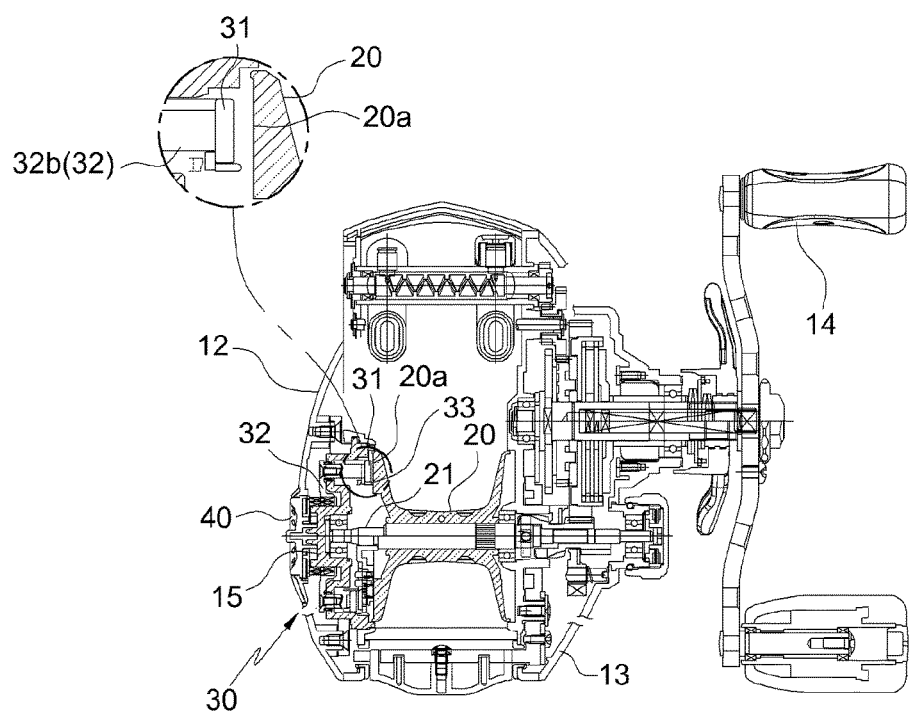
Figure 12:
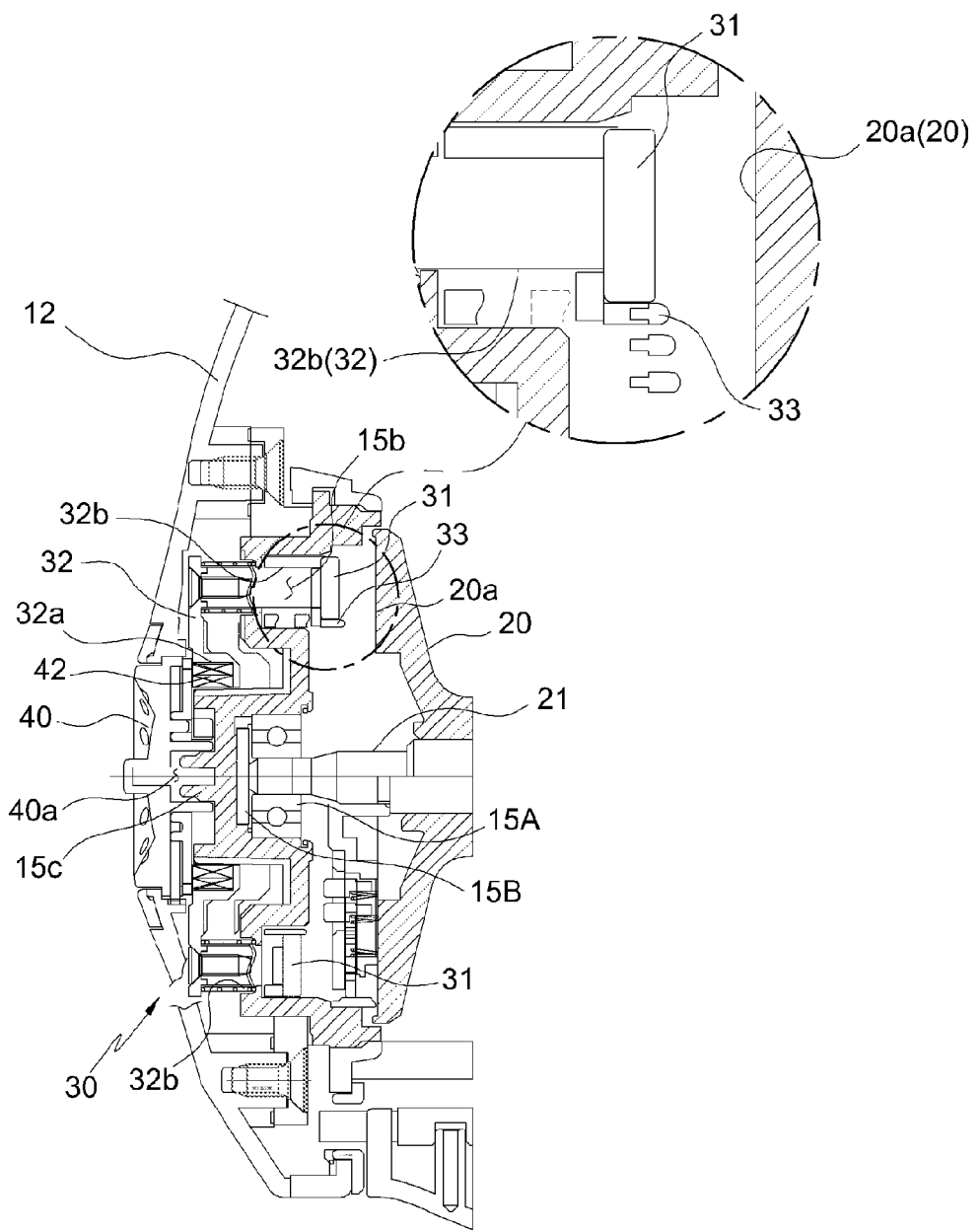
FIG. 12 is an enlarged cross-sectional view showing main parts of the third embodiment of the present invention.

Further, as enlarged in FIG. 9B, when several replaceable holders 33 having different heights are provided, a user can freely select the holders 33 and the position for the maximum braking force, if necessary.

Accordingly, a user, after purchasing the product, can set the position for the maximum braking force for use by rotating the braking dial 40 to the maximum position such that the magnet holders 33 and the spools 20 come in contact with each other, or can finely rotate the braking dial 40 step by step to separate the magnet holders 33 and the spool 20 and then set the optimum position for the maximum braking force through repeated casting exercises for use.

Further, when the maximum braking force is not normally obtained or friction is generated between the braking magnets 31 and the spool 20 in use due to wear of the holders 33, the user can readjust the position for the maximum braking force by replacing the holders 33 and then again calibrating the reel.

The present invention further includes a calibration indicator dial 50 that is disposed around the braking dial 40 to be able to rotate in two directions and can show the calibrated positions by the braking dial 40.

The calibration indicator dial 50 has calibration marks on the outer side so that a user can see the position for the maximum braking force set through the braking dial after calibrating. Therefore, the user can see the position for the optimum braking force in accordance with his/her preference using the calibration indicator dial 50 while casting.

The calibration indicator dial 50 clicks when turning.

The calibration indicator dial 50 can be applied to all the first to third embodiments and is particularly useful in the first and third embodiment in which the position of the anti-backlash unit 30 is directly adjusted by the braking dial 40.

On the other hand, the braking dial 40 and the movable members 32 may be thread-fastened to each other to adjust the position of the braking magnets 31, but in this case, when the threads break, it may be impossible to adjust the position of the anti-backlash unit 30.

Figure 13A:
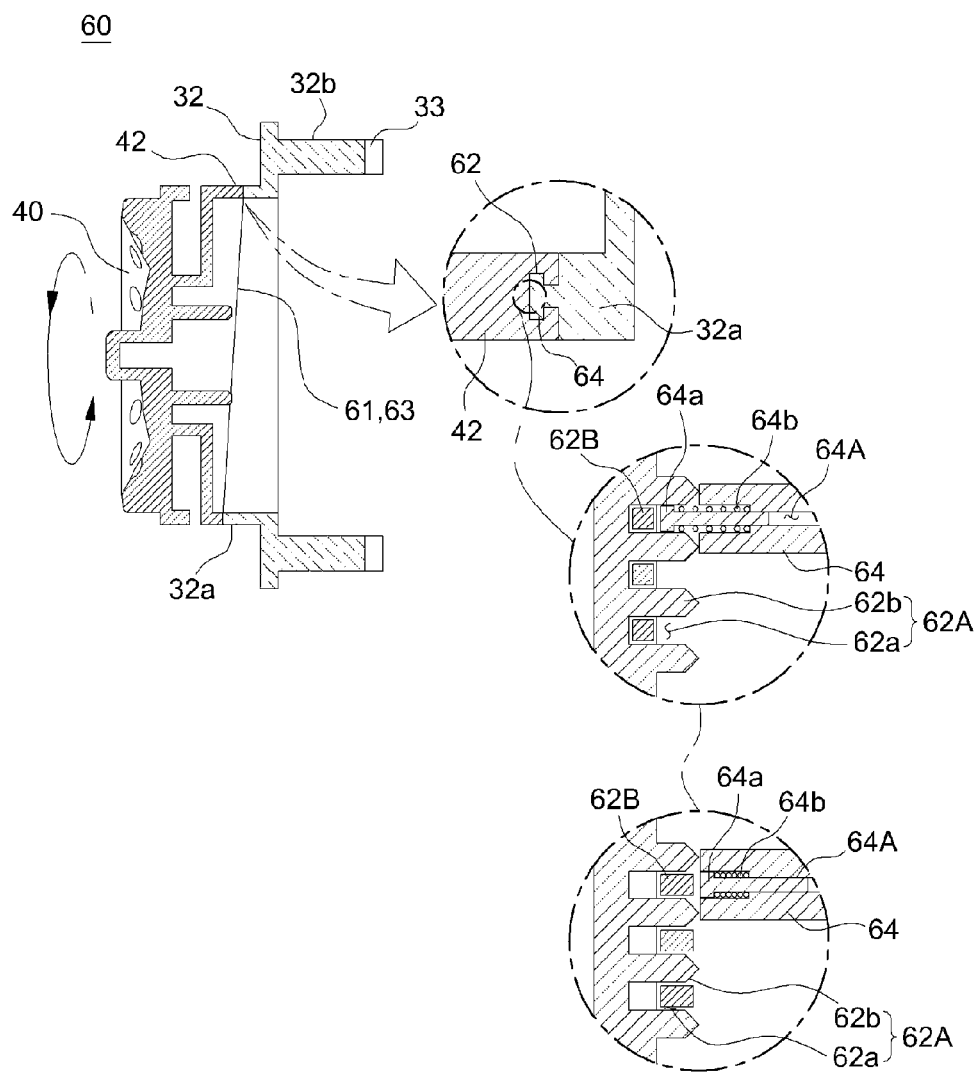
FIGS. 13A and 13B are a partial cross-sectional view schematically showing a positioning unit of the present invention and an enlarged cross-sectional view schematically showing main parts of the positioning unit.
Figure 13B:
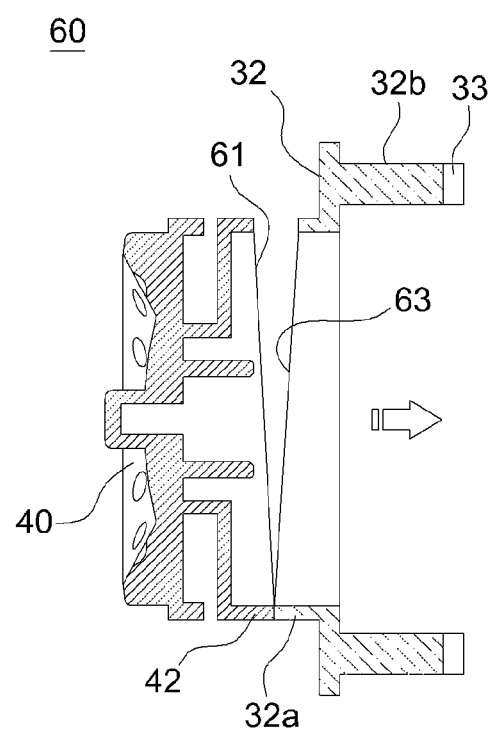

Accordingly, the present invention includes a position adjusting unit 60 that allows for more accurate and safe position adjustment of the anti-backlash unit 30 (in detail, the movable member 32) through the braking dial 40, as shown in FIGS. 13A and 13B.

The position adjusting unit 60 of the present invention has: a first circular slope 61 inclined in a first direction on the inner side of the adjuster 42 of the braking dial 40; a second circular slope 63 inclined in a second direction on the outer side of the interlock 32a of the movable member 32 to come in contact with the first circular slope 61; a guide hole 62 formed in the first circular slope 61; a guide projection 64 protruding from the second circular slope 63 to slide and lock into the guide hole 62; a threaded portion 62A protruding on the bottom of the guide hole 62; locking rods 64a elastically protruding outward from the guide projection 64 to be locked into grooves 62a of the threaded portion 62A; and pushers 62B disposed in the grooves 62a to come out of the grooves 62a and push the locking rods 64a onto ridges 62b of the threaded portion 62A from the grooves 62a when the braking dial 40 is pressed.

First, the first circular slope 61 and the second circular slope 63, which come in contact with each other on a circular plane in the rotational direction of the braking dial 40, are inclined in opposite directions.

FIG. 13A is a cross-sectional view when the braking dial 40 has been rotated to the minimum, in which the gap between the circular slopes 61 and 63 is removed, the movable member 32 has been moved toward the outer side of the reel body 10, and the braking magnets 31 are not in contact with the spool 20 (or the braking pad 22).

That is, the higher portion of the first circular slope 61 comes in contact with the lower portion of the second circular slope 63 and the lower portion of the first circular slope 61 comes in contact with the higher portion of the second circular slope 63, so the braking magnets 31 on the movable member 32 move away from the spool 20 (or the braking pad 22).

FIG. 13B is a cross-sectional view when the braking dial 40 has been rotated to the maximum. When the braking dial 40 is rotated to the maximum in the direction of an arrow shown in FIG. 13A, the first circular slope 61 presses the second circular slope 63, so the movable member 32 is moved toward the spool 20, as shown in FIG. 13B.

That is, the first circular slope 61 is rotated with the braking dial 40, but the second circular slope 63 of the movable member 32 is not rotated. Accordingly, as the first circular slope 61 is rotated, the higher portion of the first circular slope 61 moves over the second circular slope 63 and comes in contact with the higher portion of the second circular slope 63, so the movable member 32 is pressed and the braking magnets 31 move and come in contact with the spool 20 (or the braking pad 22).

In this state, when the braking dial 40 is rotated to the minimum to set the maximum braking force of the braking magnets 31 or adjust the braking force of the braking magnets 31, as in the cross-sectional view at the right upper portion in FIG. 13A, the movable member 32 is moved toward the braking dial 40 by the locking structure of the guide hole 62 and the guide projection 64, so the gap between the braking magnets 31 and the spool 20 is adjusted.

Further, as shown in the cross-sectional views at the right middle and lower portions in FIG. 13A, when the braking dial 40 is rotated in the way described above, the locking rods 64a protruding from the guide projection 64 move in and out of rod holes 64A while moving over the grooves 62a and the ridges 62b of the threaded portion 62A in the guide hole 62, so the braking dial 40 can be rotated. Further, when the braking dial 40 is stopped, the locking rods 64a are inserted into the grooves 62a by springs 64b, so the braking dial 40 cannot be rotated.

In this case, when the grooves 62a are formed too shallow with respect to the ridges 62b, the locking rods 64a may be separated out of the grooves 62a and the braking dial 40 can be rotated, even if a small external force is applied to the braking dial 40.

In contrast, when the grooves 62a are formed too deep with respect to the ridges 62b, the locking rods 64a cannot be easily separated out of the grooves 62a, so the braking dial 40 cannot be rotated.

Accordingly, the locking rods 64a are separated out of the grooves 62a and moved to the ridges 62b by the pushers 62B that are moved inward (toward the locking rods 64a) out of the grooves 62a when the braking dial 40 is pressed so that the braking dial 40 can be rotated.

That is, a user holds a handle 41 of the braking dial 40 and rotates the braking dial 40, pressing inward the braking dial 40.

In this process, as the braking dial 40 is pressed, the pushers 62B come out of the grooves 62a and push the locking rods 64a in the grooves 62a, so the locking rods 64a are inserted into the rod holes 64A. Further, in this state, the ends of the locking rods 64a are positioned at the same height as the ridges 62b, so the grooves 62a and the locking rods 64a are unlocked. Accordingly, it is possible to adjust the position of the braking magnets 32 by freely rotating the braking dial 40.

Further, when the user takes his/her hand off the braking dial 40 after finishing adjusting the position of the braking magnets 31, the braking magnets 31 return and the pushers 62B are inserted back into the grooves 62a. Further, as the pushers 62B are moved back, the locking rods 64a are pushed out of the rod holes 64A and inserted into the corresponding grooves 62a by elasticity of the springs 64b, thereby stopping rotation of the braking magnets 31.

Since the position adjusting unit 60 is provided, it is possible to easily check via the clicking by the locking rods 64a whether the braking dial has been rotated exactly to a desired position.

Further, unless the force pressing the braking dial 40 is removed, the grooves 62a and the locking rods 64a are not unlocked, so it is possible to prevent the braking dial 40 from being rotated, that is, the braking magnets 31 from being moved by an unexpected external force.

Although a bait casting fishing reel which has a specific shape and structure was described above with reference to the accompanying drawing, the present invention may be changed and modified in various ways by those skilled in the art and those changes and modifications should be construed as being included in the scope of the present invention.

What is claimed is:

1. A bait casting reel comprising:
   a spool rotatably coupled to a reel body through a shaft to wind a fishing line thereon;
   an anti-backlash unit having braking magnets disposed inside of a spool cover of the reel body to provide braking force for reducing a rotational speed of the spool using magnetic force applied to the spool from the braking magnets; and a braking dial exposed to the outside through the spool cover of the reel body to be rotated in two directions in order to adjust the braking force of the braking magnet by moving the anti-backlash unit left and right in an axial direction of the spool to adjust a gap between the braking magnets and the spool when being rotated in the two directions, wherein when the spool and the braking magnets come in contact with each other when the braking dial is rotated to a maximum, so a user can adjust the gap between the spool and the backlash unit to be minimum to set maximum braking force of the braking magnets.

2. The bait casing reel of claim 1, wherein the spool and the anti-backlash unit come in contact with each other when the braking dial is rotated to the maximum, by moving the anti-backlash unit toward the spool such that the braking magnets come in contact with an outer side of the spool when the braking dial is rotated to the maximum.

3. The bait casting reel of claim 1, wherein the spool includes a braking pad on an outer side thereof, and contact of the spool and the anti-backlash unit when the braking dial is rotated to the maximum is made in a way of making the braking pad be movable toward the anti-backlash unit in the axial direction of the spool and bringing the braking pad in contact with the braking magnets, or is made in a way of making the braking pad be replaceable from the outside of the spool and bringing a new braking pad in contact with the braking magnets.

4. The bait casting reel of claim 1, further comprising: a movable member of the anti-backlash unit disposed between a side cover and the spool cover to move left and right in the axial direction of the spool when the braking dial is rotated in two directions, wherein the anti-backlash unit has magnet holders for fixing the braking magnets to the movable member, the magnet holders protrude toward the spool further than inner sides of the braking magnets, and the spool and the anti-backlash unit come in contact with each other when the braking dial is rotated to the maximum, by moving the anti-backlash unit toward the spool such that the magnet holders come in contact with an outer side of the spool when the braking dial is rotated to the maximum.

* * * * *